Patented Dec. 5, 1933

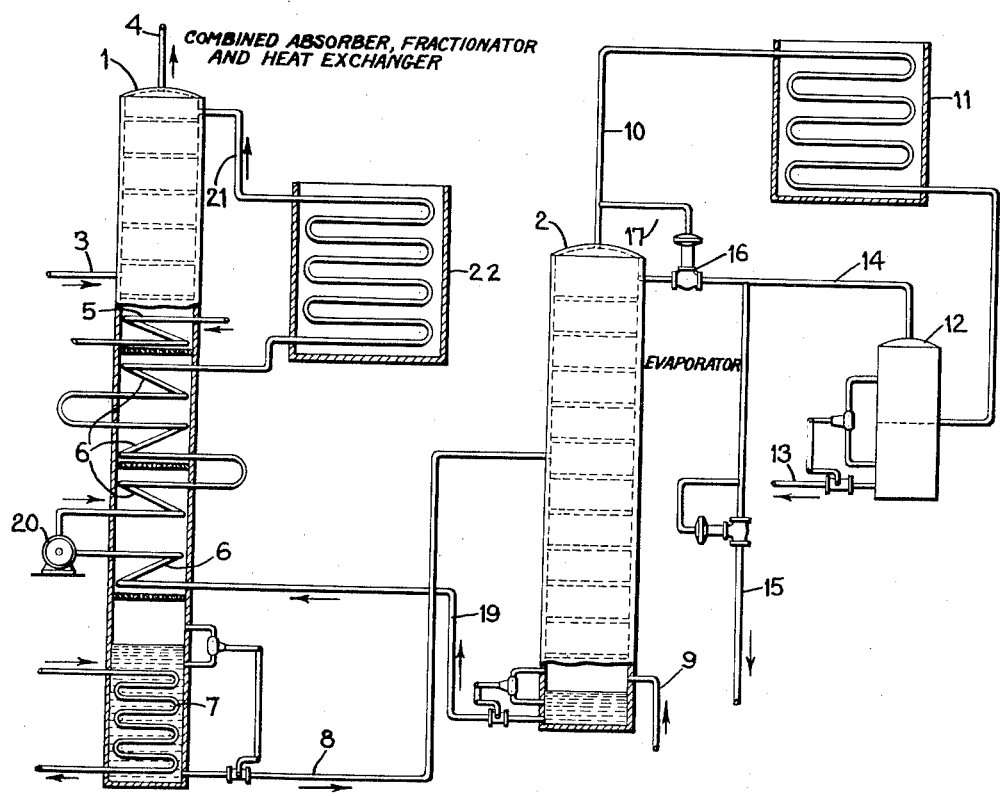

1,937,872

UNITED STATES PATENT OFFICE 1,937,872

RECOVERY OF GASOLINE FROM NATURAL GAS

Edwin R. Cox, Los Angeles, Calif., assignor to The Texas Company, New York, N. Y., a corporation of Delaware Application October 18, 1930. Serial No. 489,498

3 Claims. (Cl. 196—8)

This invention relates to the recovery of gasoline from natural gas by absorption in a liquid absorption medium and has to do particularly with the fractionation of undesirable constituents from the rich absorbent liquid while the products undergoing fractionation are in heat exchange with the lean absorbent.

The usual method of recovering gasoline from natural gas by absorption in a liquid absorption medium is to absorb all the gasoline and whatever light hydrocarbons are necessary in order to insure stripping the wet gas entirely of the gasoline content. The rich absorbent oil is passed through heat exchangers and preheaters to heat the oil to a distillation temperature and the absorbed products are distilled in an evaporator. The vapors from the evaporator are cooled to condense as much as possible of the vapors and the uncondensed vapors are then compressed to recover the gasoline content. The liquids from the condensor and the compressor are then combined to produce a gasoline. This gasoline is ordinarily so volatile, because of the large content of wild gases and vapors, that it is necessary to retreat the product by weathering or reboiling in a rectifying column or stabilizer to obtain a stable gasoline.

In accordance with the present invention the undesirable constituents are removed from the absorbent in the initial stages of the operation and the wild gases and vapors forced out with the dry gas issuing from the absorber. This is done in a novel manner by combining the heat exchange and rectifying or stabilizing steps in a single operation in a fractionating zone immediately following the absorption and prior to the distillation of the desired gasoline components from the absorption medium. A convenient apparatus also forms a part of the invention wherein the heat exchangers and fractionating tower are combined in a single fractionator adapted to receive the rich absorbent from the absorber and return undesirable vapors and gases to the absorber. If desired, the absorber may be superimposed on the fractionator and thus one compact piece of apparatus comprises the absorber, the heat exchangers, and the rectifying column.

The present invention presents several advantages over prior methods, a few of which will be particularly noted and others will be apparent from the description of the apparatus and process. It will be observed that no wild gases and vapors are unnecessarily circulated through the system and as a consequence the evaporator can be maintained under a low pressure since the volume of gases are not excessive. A substantial saving in steam for distillation and a decreased amount of cooling water in the condensers will be apparent. Also, the power required to compress the uncondensed vapors from the evaporator is not necessary in the process of the invention; ordinarily, by methods heretofore, large volumes of uncondensed vapors were recompressed to about 125 to 250 lbs. per sq. in. to recover the gasoline content. Furthermore, the apparatus of the invention is simple and compact thereby resulting in a substantial saving in cost of piping, valves, fittings and other equipment.

The accompanying drawing is an elevation partly in section of an apparatus suitable for carrying out the process of the invention.

Referring to the drawing, the apparatus comprises a combined absorber, fractionator and heat exchanger 1, and an evaporator 2. From the wet gas inlet 3 to the top of the tower 1 constitutes the absorber proper. A pipe 4 leads from the top of the tower for releasing dry gases. Below the wet gas inlet 3 is the combined fractionator and heat exchanger. While the absorber is shown superimposed on the combined fractionator and heat exchanger, the invention contemplates separate elements, thus in effect making the section above and below the wet gas inlet separate towers. The heat exchanger and fractionator includes a cooling coil 5 directly below the wet gas inlet, heat exchange coil 6 in the mid-section and a steam heating coil 7 at the base of the tower. The number and arrangement of these coils are only illustrative. In some instances the heat exchange coils may be sufficient to regulate the temperature so that the cooling coil 5 and heating coil 7 may be eliminated.

The line 8 conducts oil from the bottom of the combined fractionator and heat exchanger to the evaporator 2, entering about midway of the tower. The evaporator is the common type of stripper for removing absorbed products from a rich absorbent liquid. Pipe 9 supplies steam to agitate the liquid and to aid the vaporization of the gasoline. The vapors evolved pass through the pipe 10 to condensers 11 where they condense and drain to receiver 12. The water separating in receiver 12 drains through pipe 13. The gasoline distillate is drawn from the receiver 12 through the pipe 14 and may be passed to storage through the line 15. However, a portion of the condensate is preferably diverted through the line 16 to the top of the evaporator to act as a reflux medium and to control the end point of the gasoline. The quantity of the distillate passing through the line 16 may be controlled automatically by temperature regulator 17. The evaporator 2 may be in an elevated position, if desired, or sufficient pressure maintained therein to force the lean oil from the bottom of the evaporator through the pipe 19 and the lower coil of the heat exchangers 6. The pump 20 then forces the oil through the remaining heat exchange coils and the cooler 22 back to the absorber by the way of line 21.

In practicing the invention with the apparatus illustrated, a wet gas containing a substantial amount of gasoline vapors enters through the pipe 3 and passes up the absorber countercurrent to an absorbent liquid such as kerosene, naphtha, mineral seal or similar materials introduced through the pipe 21. The temperature of the absorbent liquid entering through the pipe 21 is maintained so that substantially only vapors of lower boiling point than butane are carried out with the dry gases issuing from the absorber through pipe 4. The rich absorbent liquid flows into the top of the combined fractionator and heat exchanger where it comes into contact with the heat exchange coils 6 in which hot lean oil from the evaporator is circulated. The hot lean oil in the coil 6 cools and at the same time gradually heats the rich absorbent oil, thereby maintaining the temperature gradient necessary for fractionation. If the temperature of the lean oil in the top coil 6 is too high, then it is further cooled in the cooler 22 and concurrently a water cooling coil 5 is used to further cool the fractionator. The temperature of the wet gas at the inlet 3 determines the oil to gas ratio in the absorber and by maintaining the temperature constant by means of the cooling coil 5, if necessary, no hot ascending vapors from the fractionator pass into the absorber to change this oil to gas ratio. The steam coil 7 below the exchanger coils 6 is preferably used to further heat the oil to completely strip it of undesirable fractions. The steam introduced through the coil 7 may be conveniently regulated by a thermostatic mechanism (not shown).

The rich oil passing through the line 8 contains only the desired gasoline fractions. The temperature of this oil will vary somewhat with the operating conditions and the nature of the oil, but the range may be said to be about 250° F. to 375° F. The pressure on the righ oil may be in the neighborhood of 30 lbs. per sq. in. This pressure is reduced in absorber 2 either by placing the evaporator in an elevated position or by using a suitable reducing valve. In the evaporator the gasoline is stripped from the absorbent liquid and the vapors passing through pipe 10 are substantially all gasoline. These vapors may be completely condensed in condenser 11, thereby leaving no wild gases necessary to be compressed. The gasoline collected in receiver 12 is stable in quality and requires no further rectifying or stabilibing treatment.

Modifications in details and uses of separate parts of the apparatus are contemplated in the invention, and therefore it is to be understood that only such limitations are to be imposed as indicated in the appended claims.

I claim:

1. The process of recovering gasoline from natural gas which comprises passing a liquid absorbent downwardly through a vapor and liquid contact zone, passing natural gas countercurrent to said absorbent to absorb the gasoline constituents by the absorbent, gradually raising the temperature of the absorbent in the downward flow to separate therefrom constituents more volatile than gasoline, removing from the bottom of said zone the absorbent with only the desired gasoline constituents dissolved therein, distilling from the removed absorbent the gasoline and passing the resultant hot lean absorbent in a stream of restricted cross section through a substantial distance of said vapor and liquid contact zone to gradually heat the mixture of absorbent and vapors therein by indirect heat exchange with the lean absorbent.

2. The process of recovering gasoline from natural gas which comprises charging a liquid absorbent downwardly through a chamber comprising a combined absorber, fractionator and heat exchanger, passing natural gas countercurrent to the absorbent in the upper portion of said chamber to dissolve the gasoline constituents of the natural gas in the absorbent, heating the lower portion of said chamber to distill constituents lighter than gasoline from the absorbent, withdrawing a rich absorbent containing only the desired gasoline constituents from the lower portion of said zone, subjecting the withdrawn rich absorbent to distillation to separate the gasoline therefrom and passing the resultant hot lean absorbent through an elongated coil in indirect heat exchange with the mixture of vapors and absorbent in the intermediate portion of said zone to gradually heat and to fractionate therefrom the more volatile constituents.

3. The process of recovering gasoline from natural gas which comprises introducing natural gas containing gasoline constituents to an intermediate portion of a tower comprising a combined absorber, fractionator and heat exchanger to pass upwardly through an upper portion thereof countercurrently to an absorbent passing downwardly therein whereby absorption of the gasoline constituents in said absorbent is effected, separating from the rich absorbent by fractionation in a lower portion of said tower constituents lighter than gasoline, releasing the gases from which the gasoline constituents have been separated from the top portion of said tower, withdrawing rich absorbent containing substantially only the desired gasoline constituents from the bottom portion of said tower, subjecting the withdrawn rich absorbent to distillation to remove the gasoline constituents therefrom, passing the resultant lean absorbent, from which the gasoline constituents have been removed, while hot, in a restricted stream through said lower portion of said tower in indirect heat exchange with the absorbent and vapors therein, then cooling the lean absorbent and passing the same into the upper portion of said tower.

EDWIN R. COX.